United States Patent Office 3,784,709
Patented Jan. 8, 1974

---

3,784,709
POLYOXYALKYLENE DERIVATIVES OF POLY-GLYCEROL ESTERS AS DOUGH CONDITIONERS
Antal G. Oszlanyi, Brook Park, and Richard J. Zielinski, Middleburg Heights, Ohio, assignors to SCM Corporation, Cleveland, Ohio
No Drawing. Filed Jan. 18, 1971, Ser. No. 107,513
Int. Cl. A21d 2/16
U.S. Cl. 99—91                                   5 Claims

ABSTRACT OF THE DISCLOSURE

Yeast-raised bakery products are shown containing as a portion of the dough conditioner therefor a polyoxyalkylene derivative of a polyglycerol higher fatty acid ester.

---

Dough conditioners for yeast-raised bakery products particularly bread have been widely used, especially in the continuous process of making bread for increasing the shock tolerance of the bakery product. Shock tolerance is an important feature of a yeast-raised bakery food product because often the unbaked product is subjected to impact due to sudden stopping and starting of a conveyor belt in the making of bread. A proofed, unbaked bakery product having poor shock tolerance collapses on impact, thus destroying the cellular structure of the bakery product and producing a condensed, pressed baked product as opposed to a light, fluffy, baked product having uniform cellular structure.

Monoglycerides have been widely used in baked goods to retard staleness, to improve texture, to improve the specific volume of the finished bakery product, and provide prolonged compressibility (softness) of the bakery product.

Ethoxylated monoglycerides typically prepared by condensing ethylene oxide with a partial glyceride have also been used for their dough conditioning properties and have been incorporated with monoglycerides as the dough conditioner in preparing bakery products. Ethoxylated monoglycerides and their combination with α-monoglycerides is shown in U.S. Pat. 3,433,645.

It has been found that yeast-raised bakery goods, e.g., rolls, bread, etc. containing from 0.05–1% of a dough conditioner basis weight of flour can be improved by including as a portion of the dough conditioner a polyoxyalkylene derivative of a polyglycerol higher fatty acid ester.

The advantages of the process and product of this invention include: desirable specific volume of a finished bakery product; desirable shock tolerance for the unproofed, unbaked product; desirable anti-staling properties; and excellent bread score.

By a polyoxyalkylene derivative of a polyglycerol higher fatty acid ester, it is meant to refer to the ethylene and propylene oxide condensation products of the polyglycerol higher fatty acid ester. Although propylene oxide can be employed in forming the condensation product, it is not normally used for reasons of efficiency and economy. Generally, not substantially more than 20% propylene oxide basis weight of the ethylene oxide used in forming the condensation product, and preferably no propylene oxide is employed as the alkylene oxide. Thus, the preferred polyoxyalkylene derivative of a polyglycerol higher fatty acid ester is a polyoxyethylene derivative.

Polyglycerol esters are known and widely used in the synthesis of edible comestibles. Typically, these esters have anywhere from 2–30 glycerol units in the chain. However, more commonly they have from 2–10 glycerol units. Virtually, any of the polyglycerol esters used for making food products can be used for making the polyoxyalkylene derivative. For reasons of efficiency and economy, triglycerol monostearate is the preferred polyglycerol ester used in making such derivatives.

One of the primary methods of preparing polyglycerol esters is to firm preform the polyglycerol unit by polymerizing glycerol in the presence of alkaline catalyst such as sodium hydroxide at a temperature of from about 250°–270° C., then esterify the polyglycerol unit with a fatty acid. The resultant polyglycerol ester product, of course, is not a single polyglycerol polymer, but contains a combination of polymers. However, for reasons of efficiency and economy, the conditions are controlled in order to produce an ester referred to as triglycerol monostearate.

The polyoxyalkylene derivatives of the polyglycerol higher fatty acid esters can also be prepared in several ways. One of the ways is to first polymerize glycerol to form the polyglycerol mixture, then react the polyglycerol mixture with the alkylene oxide, then react the polyoxyalkylene derivative with either a fatty acid, a fatty acid halide or glyceride, e.g., mono-, di-, or triglyceride. Another method is to first form the polyglycerol ester, then react this product with alkylene oxide. In both types of reactions an alkaline catalyst, e.g., sodium hydroxide, or potassium hydroxide is normally used to accomplish polymerization of the glycerol molecule and to effect condensation and esterification. Of course, it is to be understood that pure products seldom are produced by such reactions. The reaction product may contain slight amounts of polyglycerol ester, mono- and di-esters of polyglycerol, and the like, but the major proportion of the reaction product is a polyoxyalkylene derivative of a polyglycerol higher fatty acid ester.

Typical analysis of the product ethoxylated triglycerol monostearate, shows a hydroxyl number of 140–180 and an ester number of from 40–65 and acid value not substantially more than 2 and less than 1.

The molar proportion of alkylene oxide in the polyoxyalkylene polyglycerol higher fatty acid ester typically is between 10–50 moles ethylene oxide per mole of polyglycerol and for reasons of efficiency and economy, the molar proportion should be between about 18–22 moles alkylene oxide (preferably ethylene oxide) per mole of polyglycerol ester.

The ester portion of the polyoxyethylene derivative of polyglycerol is supplied by a higher fatty acid or higher fatty acid radical-supplying material, e.g., a glyceride. By a higher fatty acid ester it is meant those esters where the fatty acid radical portion has between about 12–22 carbon atoms in the structure. The fatty acid can be saturated or unsaturated and typically is selected from oleic, stearic, behenic, palmitic, and other fatty acids well known in the art.

Other additives in conjunction with the polyoxyalkylene derivative of polyglycerol higher fatty acid esters can be employed in making the yeast-raised bakery products. Suitable additives includes those conventionally used for making yeast-raised bakery goods, e.g., alpha-monoglyceride and diglycerides, calcium stearoyl-1-lactylate, propylene glycol mono-esters, e.g., propylene glycol lactostearate, propylene glycol monostearate, ethoxylated monoglyceride, and the like. It has been found that excellent results are obtained when the polyoxyethylene derivative of polyglycerol mono-esters is combined with alpha-monoglyceride in a ratio of from about 40 parts polyoxyethylene derivative of polyglycerol mono-esters:60 parts alpha-monoglyceride to about 60 parts polyoxyethylene derivative of polyglycerol mono-esters:40 parts alpha-monoglyceride.

Although the other additives can be incorporated into the dough conditioner set forth, it is preferred that at least 40% of the dough conditioner comprise the polyoxyalkylene derivative of a polyglycerol higher fatty acid ester and preferably at least 80% and above, except where the polyoxyalkylene derivative is combined with the alpha-monoglyceride. Then the proportion as set forth in the ranges before stated are preferred.

In making the yeast-raised bakery products the dough conditioner is usually included in an amount of from about 0.05–1% by weight of the flour content. Preferably for making bread the level of dough conditioner is maintained between about 0.1–0.5% basis weight of the flour. Often when the levels of dough conditioner fall below or above the levels set forth, the quality of the product diminishes.

It has been found that excellent results are obtained in the making of bread by the sponge-dough process, straight dough process and by the continuous process, all processes being known to those skilled in the art. Two processes are described in U.S. Pat. 3,433,645 and such processes are incorporated by reference. Although the sponge-dough process is the most widely used at the present time, the continuous process, because of its economic advantages, has gained wide acceptance.

The sponge-dough method for preparing bread involves the preparation of two distinct mixtures, the sponge and the dough. The ingredients for the two mixtures are illustrated in Table I.

TABLE I

| Sponge ingredients: | Parts |
|---|---|
| Flour | 65 |
| Water | 37.2 |
| Yeast | 2.5 |
| Yeast food | 0.5 |
| Dough ingredients: | |
| Flour | 35 |
| Sugar | 8 |
| Salt | 2 |
| Shortening (e.g., lard) | 3 |
| Non-fat milk product | 6 |
| Water | 28 |
| Dough conditioner | 0.5 |

In the sponge-dough process, the sponge is prepared by first mixing the yeast and yeast food in the sponge water. The resultant yeast solution is added to the flour and blended for approximately four minutes until thoroughly mixed. The sponge then is allowed to ferment at a temperature of 86° F. and relative humidity of 75% for about 4½ hours. After fermentation, the sponge mixture is returned to the mixer with the dough ingredients and mixed for approximately 10–12 minutes. After the mixing, the resultant dough is allowed to rest for about 18–20 minutes. The dough is separated, shaped and placed in loaf pans for proofing and baking, baking usually requiring about 25 minutes at a temperature of 425° F.

The continuous process involves the preparation of brew or liquid sponge from the ingredients described in Table II. The liquid sponge or brew contains the salt, yeast, sugar, milk, water and from 0–70% of the flour and is fermented for approximately 2½ hours. After fermentation, the brew, shortening, oxidants and remainder of the flour are metered to a premixer and combined.

TABLE II

| Ingredients: | |
|---|---|
| Flour | 100 parts. |
| Water | 66 parts. |
| Salt | 2 parts. |
| Yeast | 2.5 parts. |
| Sugar | 8 parts. |
| Non-fat milk product | 3.5 parts. |
| Shortening | 2.5 parts. |
| Dough conditioner | 0.5 part. |
| Oxidants (e.g., potassium bromate, potassium iodate) | 75 p.p.m. (max.) based on flour weight. |

All of the ingredients are fed from the premixer continuously into a developer head and mixed to form a continuous dough mass. The developer employed in the continuous process is hydrostatically full, with no gas-filled space, and operated at a pressure of 50–60 pounds. The dough then is continuously extruded, cut off and deposited in baking pans for proofing and baking.

The straight dough process encompasses the fermenting of all the ingredients, after mixing, as listed in Table III for approximately two hours. After fermentation the dough is separated, shaped, placed in pans, proofed and baked at a temperature of 425° F. for 25 minutes.

TABLE III

| Ingredients: | Parts |
|---|---|
| Flour | 100 |
| Water | 67 |
| Sugar | 5 |
| Salt | 2 |
| Yeast | 3 |
| Non-fat milk product | 4 |
| Shortening | 3 |
| Dough conditioner | 0.5 |
| Yeast food | 0.5 |

The following specific examples are provided to illustrate preferred embodiments of the invention but are not intended to limit the scope thereof. All parts are parts by weight, all percentages are weight percentages, and all degrees are degrees Fahrenheit, unless otherwise specified.

EXAMPLE 1

Preparation of ethoxylated triglycerol monostearate

One mole of triglycerol monostearate is charged to a reaction vessel and melted by heating to a temperature of 320° F. A dry nitrogen gas sweep is passed through the contents for about 15 minutes to remove substantially all traces of water and oxygen. After removal of the water and all but trace amounts of oxygen, 20 moles ethylene oxide are gradually charged to the vessel. The pressure is maintained between 40–60 p.s.i.g. during addition of the ethylene oxide. The ethoxylation reaction is allowed to proceed at a temperature between about 320–340° F. until all of the ethylene oxide has been added and the pressure drops to around 0–20 p.s.i.g. At the completion of the reaction the product is cooled to room temperature (70° F.) and neutralized with phosphoric acid.

EXAMPLE 2

A polyoxyethylene derivative of triglycerol monostearate is prepared as follows: one mole of a nominal triglycerol and ½₀₀ mole potassium hydroxide are charged to a reaction vessel and heated to a temperature of 320° F. Then 20 moles of ethylene oxide are gradually charged to the vessel, the pressure being maintained at about 40–60 p.s.i.g. during addition of the ethylene oxide. The temperature is maintained at 320°–340° F. until substantially all of the ethylene oxide is reacted. Then the product is cooled to a temperature of 250° F. Then, one mole of stearic acid is charged to the vessel and the contents heated to 500° F. and the water formed is removed. The reaction is discontinued when the acid value reaches two or lower.

EXAMPLE 3

Bread loaves made by the continuous process are prepared with the dough conditioner of Example 1 for comparison against a bread loaf employing a commercial ethoxylated monoglyceride dough conditioner also made by such process. The basic bread formulation is as follows.

Ingredients:
- Flour — 100 parts.
- Water — 66 parts.
- Salt — 2 parts.
- Sugar — 4 parts.
- Shortening (unemulsified) — 2.5 parts.
- Milk powder — 5 parts.
- Yeast — 1.5 parts.
- Dough conditioner — 0.5 part.
- Oxidants (e.g., potassium bromate) — 75 p.p.m. (based on flour weight).

The resulting bread loaves are evaulated for (a) specific volume in terms of cubic centimeters/gram of bread, the higher the specific volume the more desirable the bread; (b) shock loss, which is a measurement of the percentage loss in specific volume when a proofed, unbaked loaf of bread is allowed to slide down a 3-roller conveyor tilted at an angle of 16.5° to the horizontal plane and collide with stopper at the bottom of the conveyor. Proofing bread refers to the process wherein unbaked bread is allowed to stand for approximately one hour at 100° F., relative humidity of 85–100% and rise. The lower the percentage of shock loss the more desirable is the bread; (c) anti-staling, which is the energy in inch-grams required to depress the crumb of a baked loaf of bread ½" after 5 days storage at 72° F. and 50% relative humidity, the lower the anti-staling number the softer and more desirable the bread; and (d) bread score. Bread score is an overall evaluation of the baked loaf of bread wherein a number is assigned to the bread, with 100 being a perfect score, 80 or lower being unacceptable, 90 being good to excellent. In determining the bread score, consideration is given to the texture of the bread, cellular structure of the crumb (uniformity), break and shred, flavor, odor, taste, volume in cc./gram, and color. Table IV below represents the data obtained by such testing.

TABLE IV

| Bread | Spec. vol., cc./gm. | Shock loss, percent | Bread score | Anti-staling, in.-gm. |
|---|---|---|---|---|
| Dough conditioner of Example 1 | 7.01 | 5.3 | 90 | 42.15 |
| Ethoxylated monoglyceride dough conditioner | 6.89 | 4.5 | 87 | 39.53 |

The above results show that the polyoxyethylene derivative of triglycerol monostearate compares favorably to the commercially successful ethoxylated monoglyceride emulsifier.

What is claimed is:

1. In a process for preparing yeast-raised bakery goods including the step of combining at least the ingredients of flour, water, yeast, and dough conditioner to form a dough which is subsequently baked the dough conditioner being present in the amount of about 0.05 to 1 weight percent based on the flour, the improvement which comprises:
   including at least about 80 percent by weight in said dough conditioner a polyoxyethylene derivative of a higher fatty acid ester of polyglycerol having at least two glycerol units.

2. The process of claim 1 wherein said dough conditioner is present in an amount of from 0.1–0.5 weight percent based on the flour content.

3. The process of claim 1 wherein said polyoxyalkylene derivative of polyglycerol higher fatty acid ester contains from 10–50 moles combined ethylene oxide per mole of polyglycerol ester, and the polyglycerol ester has from 2–10 glycerol units.

4. The process of claim 1 wherein the polyoxyethylene derivative of a higher fatty acid ester of polyglycerol is ethoxylated triglycerol monostearate.

5. The process of claim 1 wherein substantially all said dough conditioner comprises said polyoxyethylene derivative of a higher fatty acid ester of polyglycerol.

References Cited
UNITED STATES PATENTS 3,433,645  3/1969  Egan et al. — 99—91 X
3,615,681  10/1971  Duross et al. — 99—91

A. LOUIS MONACELL, Primary Examiner

J. R. HOFFMAN, Assistant Examiner

U.S. Cl. X.R.

426—226

UNITED STATES PATENT OFFICE
CERTIFICATE OF CORRECTION

Patent No. 3,784,709   Dated January 8, 1974

Inventor(s) Antal G. Oszlanyi; Richard J. Zielinski

It is certified that error appears in the above-identified patent and that said Letters Patent are hereby corrected as shown below:

Column 2, line 4, "firm" should read --first--; line 36, before "less" insert --usually--;

Column 5, line 18, after "3" insert --foot--.

Signed and sealed this 16th day of July 1974.

(SEAL)
Attest:

McCOY M. GIBSON, JR.
Attesting Officer

C. MARSHALL DANN
Commissioner of Patents